(12) United States Patent
Gill et al.

(10) Patent No.: US 7,519,249 B2
(45) Date of Patent: Apr. 14, 2009

(54) SEMICONDUCTOR OPTICAL MODULATOR

(75) Inventors: Douglas Gill, South Orange, NJ (US); Mahmoud Rasras, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 18 days.

(21) Appl. No.: 11/684,625

(22) Filed: Mar. 11, 2007

(65) Prior Publication Data

US 2008/0219614 A1  Sep. 11, 2008

(51) Int. Cl.
  *G02B 6/26* (2006.01)
  *G02B 6/42* (2006.01)
  *G02B 26/00* (2006.01)
  *G02F 1/035* (2006.01)
  *G02F 1/295* (2006.01)
  *G02F 1/03* (2006.01)
  *G02F 1/07* (2006.01)

(52) U.S. Cl. ................. 385/39; 385/3; 385/8; 359/237; 359/245

(58) Field of Classification Search .................. 385/39
  See application file for complete search history.

(56) References Cited

U.S. PATENT DOCUMENTS

| 5,926,496 | A * | 7/1999 | Ho et al. | 372/92 |
| 6,341,184 | B1 * | 1/2002 | Ho et al. | 385/3 |
| 2007/0147724 | A1 * | 6/2007 | Ishizaka | 385/8 |
| 2008/0013876 | A1 * | 1/2008 | Gill et al. | 385/1 |
| 2008/0165565 | A1 * | 7/2008 | Gunter et al. | 365/145 |

OTHER PUBLICATIONS

Xie et al.; "Linearized Mach-Zehnder Intensity Modulator"; Apr. 2003; Photonics Technology Letters, IEEE; vol. 15, Issue 4; pp. 531-533.*

X.Xie, J.Kurgin, J.Kang, "Linearized Mach-Zehnder Intensity Modulator", IEEE Photonics Technology Letters, vol. 15,No. 4,Apr. 2001.

* cited by examiner

*Primary Examiner*—Uyen Chau N Le
*Assistant Examiner*—Kajli Prince (57) ABSTRACT

Semiconductor optical modulator devices exhibiting improved chirp characteristics are constructed from a Mach-Zehnder structure having resonators positioned within each arm and a number of phases shifters positioned within the arms, and/or resonators.

6 Claims, 13 Drawing Sheets

SEMICONDUCTOR OPTICAL MODULATOR

UNITED STATES GOVERNMENT INTEREST

The United States Government has a paid-up license in this invention and the right in limited circumstances to require the patent owner to license others on reasonable terms as provided for the by the terms of contract No. HR0011-05-C-0027 awarded by the Defense Research Project Agency.

FIELD OF THE INVENTION

This invention relates generally to the field of optical communications and in particular to optical modulators exhibiting improved chirp characteristics.

BACKGROUND OF THE INVENTION

Optical modulators constructed from Si or other semiconductor materials may impart certain phase changes or "chirp" to optical signals upon which they operate. Unfortunately, chirping degrades certain transmission qualities of modulated light.

In addition, Si modulators exhibit a waveguide loss that is dependent upon refractive index change. Modulators exhibiting such index-change-dependent waveguide loss are unsuitable for use with many modulation formats that are used in advanced optical communications systems.

In an article entitled "Linearized Mach-Zehnder Intensity Modulator" authored by X. Xie, J. Khurgin and J. Kang which appeared in IEEE Photonics Technology Letters, Vol. 15, No. 4, in April 2003, the authors describe an optical modulator in which certain deficiencies were overcome, but not the undesirable chirping.

SUMMARY OF THE INVENTION

The problem of chirping in a semiconductor optical modulator is substantially overcome in accordance with the principles of the invention, by employing resonators in each arm of a Mach-Zehnder device which is made part of the modulator. In a preferred embodiment, the resonators are ring resonators and the Mach-Zehnder device is driven in a push-pull configuration.

In accordance with an aspect of the present invention, each of the resonators exhibits a particular resonance that substantially overlaps one another when the modulator is turned off and have less overlap when the modulator is turned on. In sharp contrast to prior art configurations, this configuration advantageously reduces any required optical index changes which, in turn, reduces changes in propagation losses experienced in, for example, carrier injected silicon waveguide structures thereby minimizing the chirp.

In accordance with yet another aspect of the invention, an optical modulator so constructed may advantageously produce differential phase shift keying (DPSK) and higher order advanced modulation formats with minimal chirp.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1A:
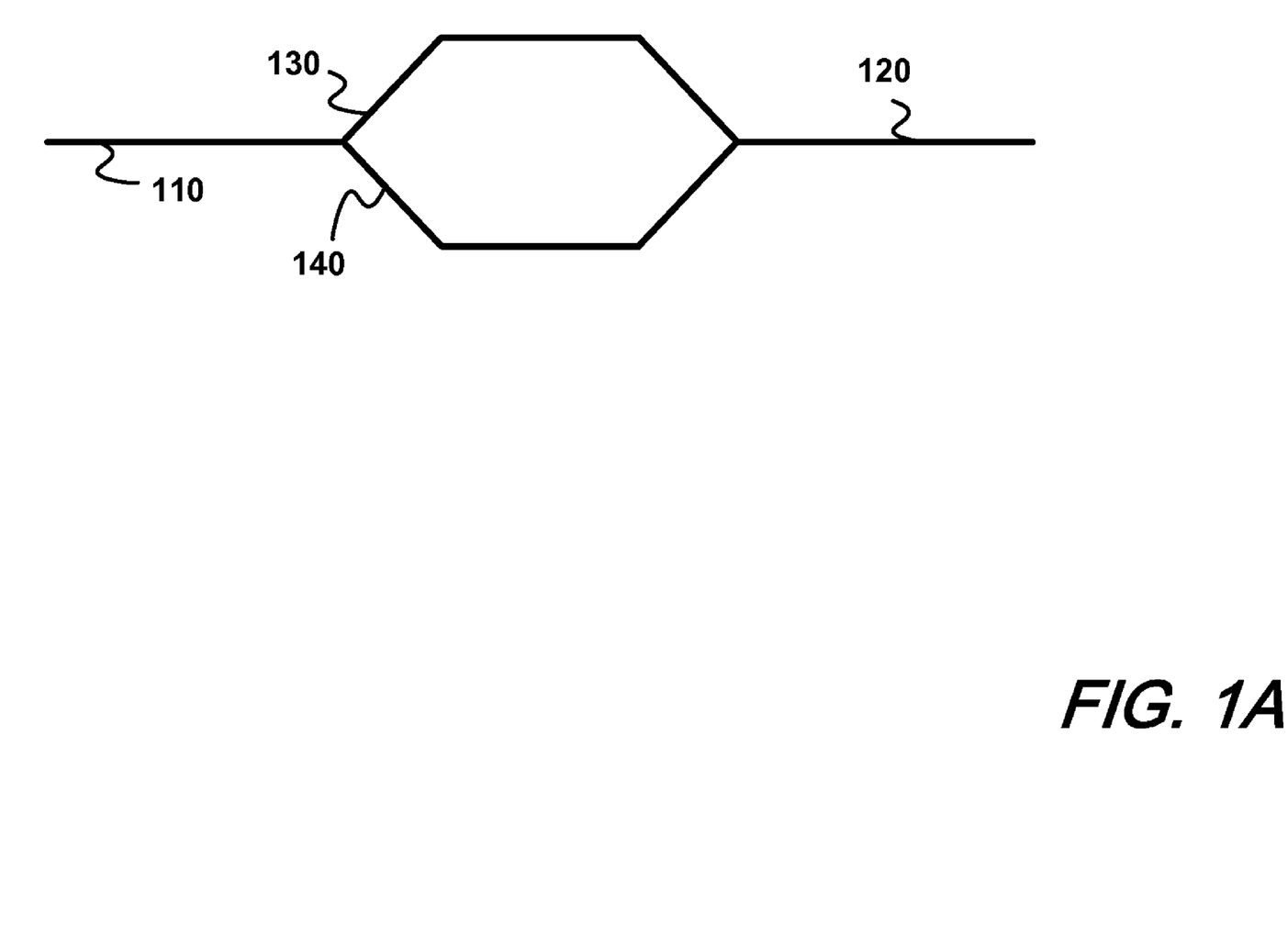
FIG. 1A is a schematic of a prior-art optical Mach-Zehnder modulator.

FIG. 1A shows a schematic of a prior art optical modulator apparatus which is known to those skilled in the art as a Mach-Zehnder modulator Such optical modulators are one of the key components for signal transmission systems and a number of types are known and understood. As can be appreciated, the simplicity of the Mach-Zehnder modulator contributes to its wide utilization in optical systems.

With continued reference to that FIG. 1A, it may be observed that the Mach-Zehnder modulator structure includes an input waveguide 110 and an output waveguide 120, optically connected by a pair of waveguide arms 130, and 140. Accordingly, an optical signal applied to the input waveguide 110 will exit the output waveguide 120 after traversing the modulator via upper arm 130 and/or lower arm 140.

Figure 1B:
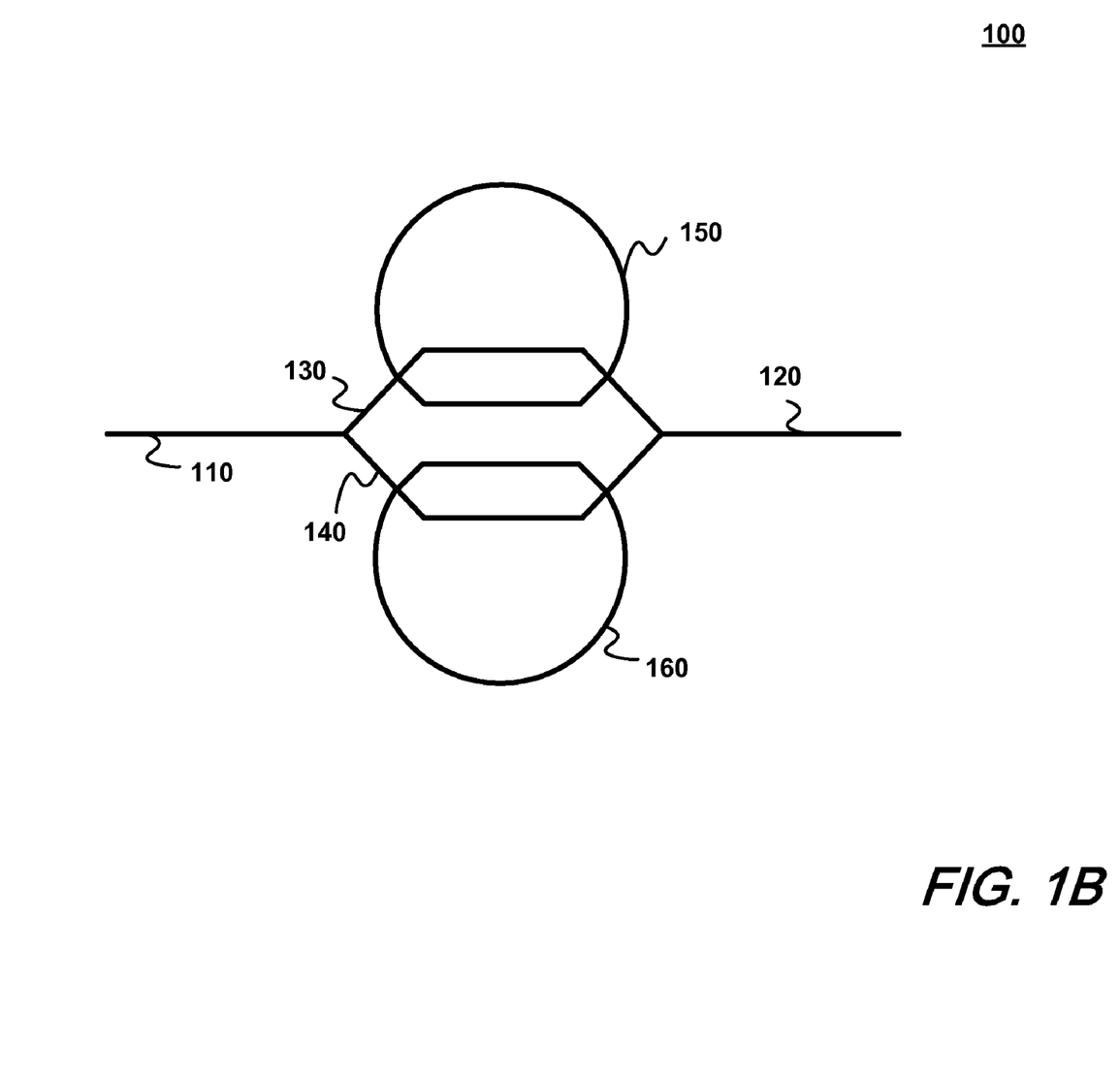
FIG. 1B is a schematic of an optical Mach-Zehnder modulator according to the present invention.

Turning now to FIG. 1B, there is shown a Mach-Zehnder modulator—according to the present invention—that includes a pair of ring resonators 150, 160, wherein one ring resonator is positioned in both the upper arm 130 and the lower arm 140, respectively.

At this point it should be noted that the resonator structures 150, 160 are shown as being outside of the Mach-Zehnder structure. Those skilled in the art will appreciate that such resonators (either ring resonators or others) may be within the Mach-Zehnder structure(s) as well. For the purposes of the present invention, it is only required that such resonator structures be optically coupled to the arms of the modulator.

According to the present invention, the ring resonator 150 positioned within the upper arm 130 is set such that its resonance is offset from light to be modulated. Similarly, the ring resonator 160 positioned within the lower arm is set such that its resonance is offset to an opposite side of the modulated light.

Those skilled in the art will readily understand that the resonance positions may be moved relative to one another and the light to be modulated by any of a number of mechanisms. For example, the semiconductor materials may be doped to create charge carriers, the number of charge carries may be changed, and the optical paths may be changed through a redistribution of the charge carriers. Operationally, such resonance peak movement may be accomplished by applying a forward bias to the structure or otherwise applying a necessary voltage over a particular area of the semiconductor structure.

Figure 2:
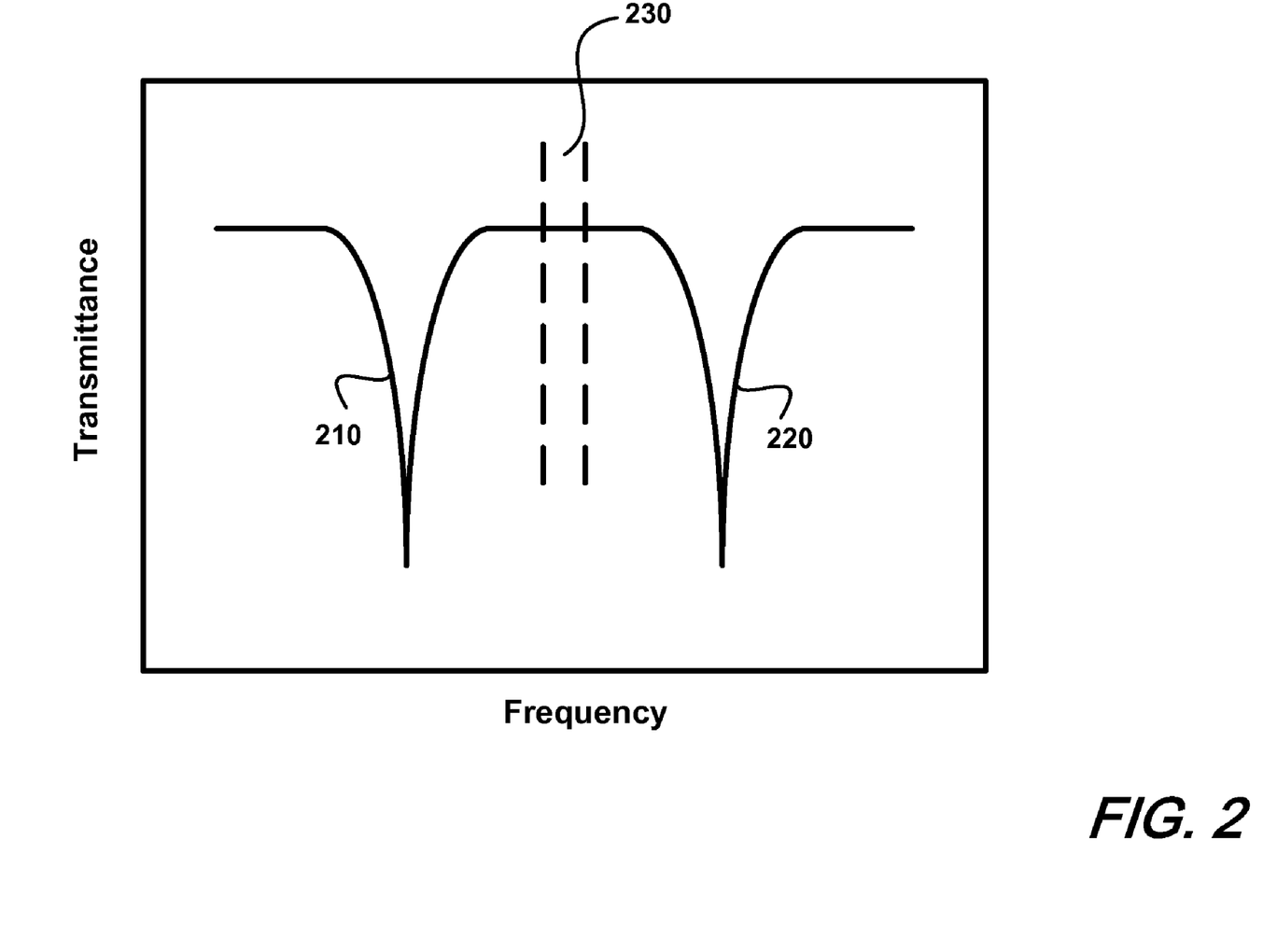
FIG. 2 is a graph of Transmittance vs. Frequency for a modulator such as that of FIG. 1, depicting the resonance offset from light to be modulated for each of the arms.

The spectral effects of these structural relationships may be understood with reference to FIG. 2, which shows a graph of optical power vs. frequency for the structure shown in FIG. 1B. More specifically, the resonance in one arm 210 and the resonance in the other arm 220 are shown graphically relative to the frequency range of the light to be modulated 230.

Figure 3:
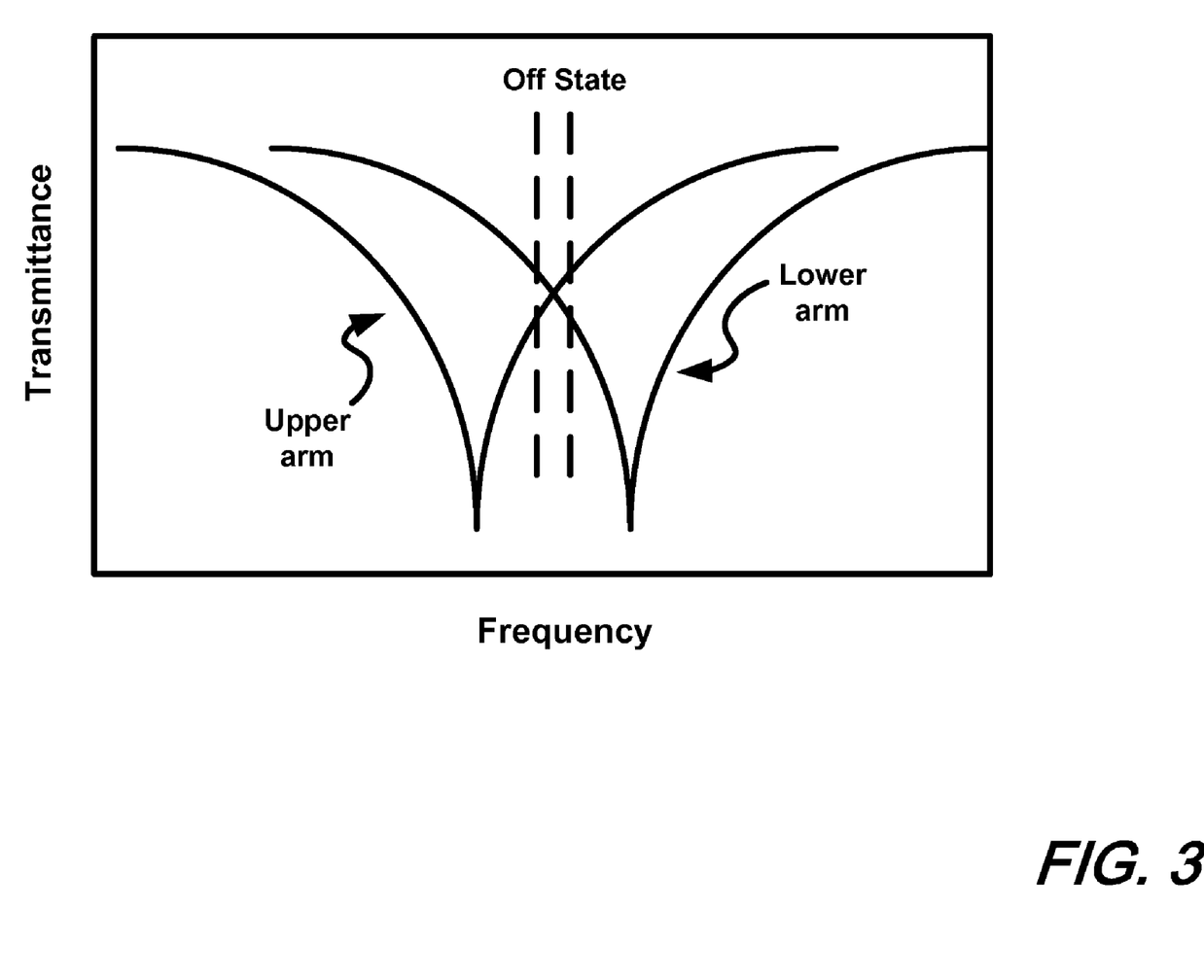
FIG. 3 is a graph of Transmittance vs. Frequency for a modulator such as that of FIG. 1, showing an "off" state of the modulator.

According to the present invention, the modulator 100 of FIG. 1B is set to an "off" state when—as depicted in the graph of FIG. 3—the two resonances of the upper arm and the lower arm sufficiently overlap each other and the light to be modulated is "in-between" them.

As can be observed from this FIG. 3, the overlap between the two resonances is only partial, consequently the Mach-Zehnder modulator is turned off predominately because of the phase changes caused by the resonance locations in each of the arms. It should be noted that while we have depicted the frequencies shown in the graph of FIG. 3 as being associated with a particular arm, i.e., "upper arm" or "lower arm", the frequencies shown associated with a particular arm are for the purpose of explanation only, and either of the arms may be associated with a particular transmittance vs. frequency graph.

Figure 4:
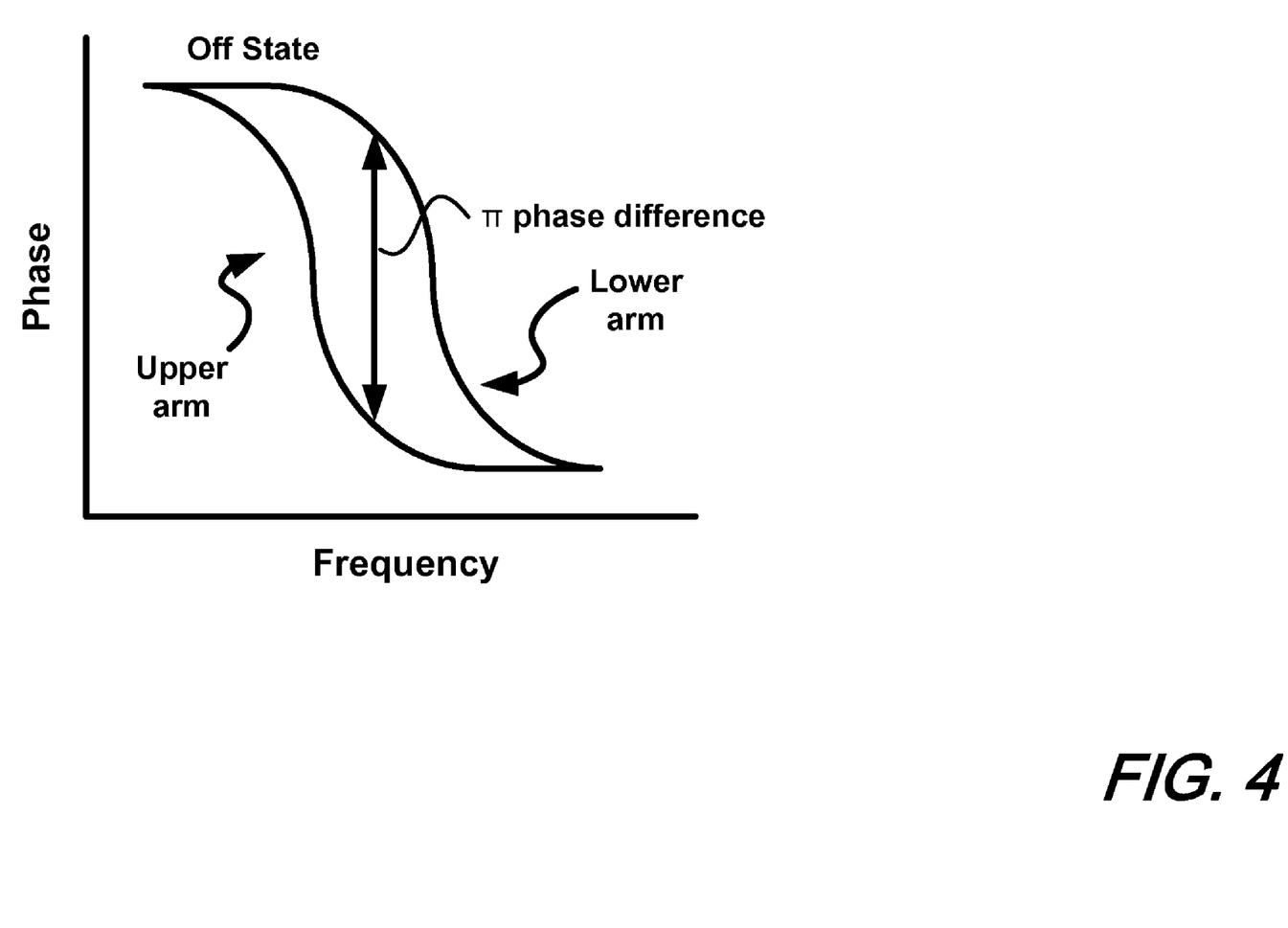
FIG. 4 is a graph of Phase vs. Frequency depicting the $\pi$ phase difference between the lower arm and the upper arm of the modulator of FIG. 1 producing an "off" state in the modulator.
Figure 5:
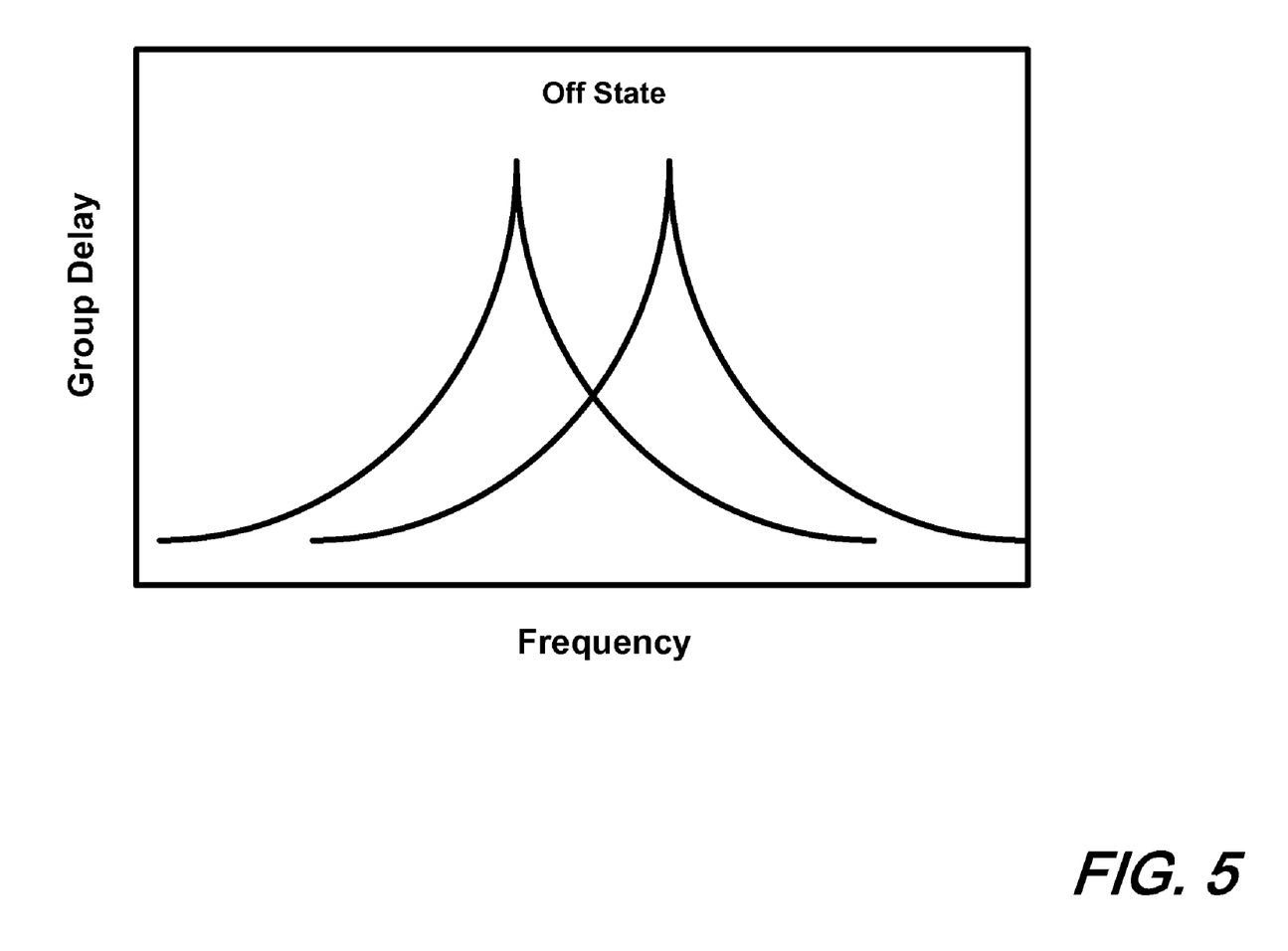
FIG. 5, is a graph of Group Delay vs. Frequency at an off-state for the modulator of FIG. 1.

With reference now to FIG. 4, there it shows a graph of Phase vs. Frequency depicting the $\pi$ phase difference between the lower arm and the upper arm of the modulator of FIG. 1, while FIG. 5 is a graph of group delay vs. frequency for the off-state of the modulator.

Figure 6:
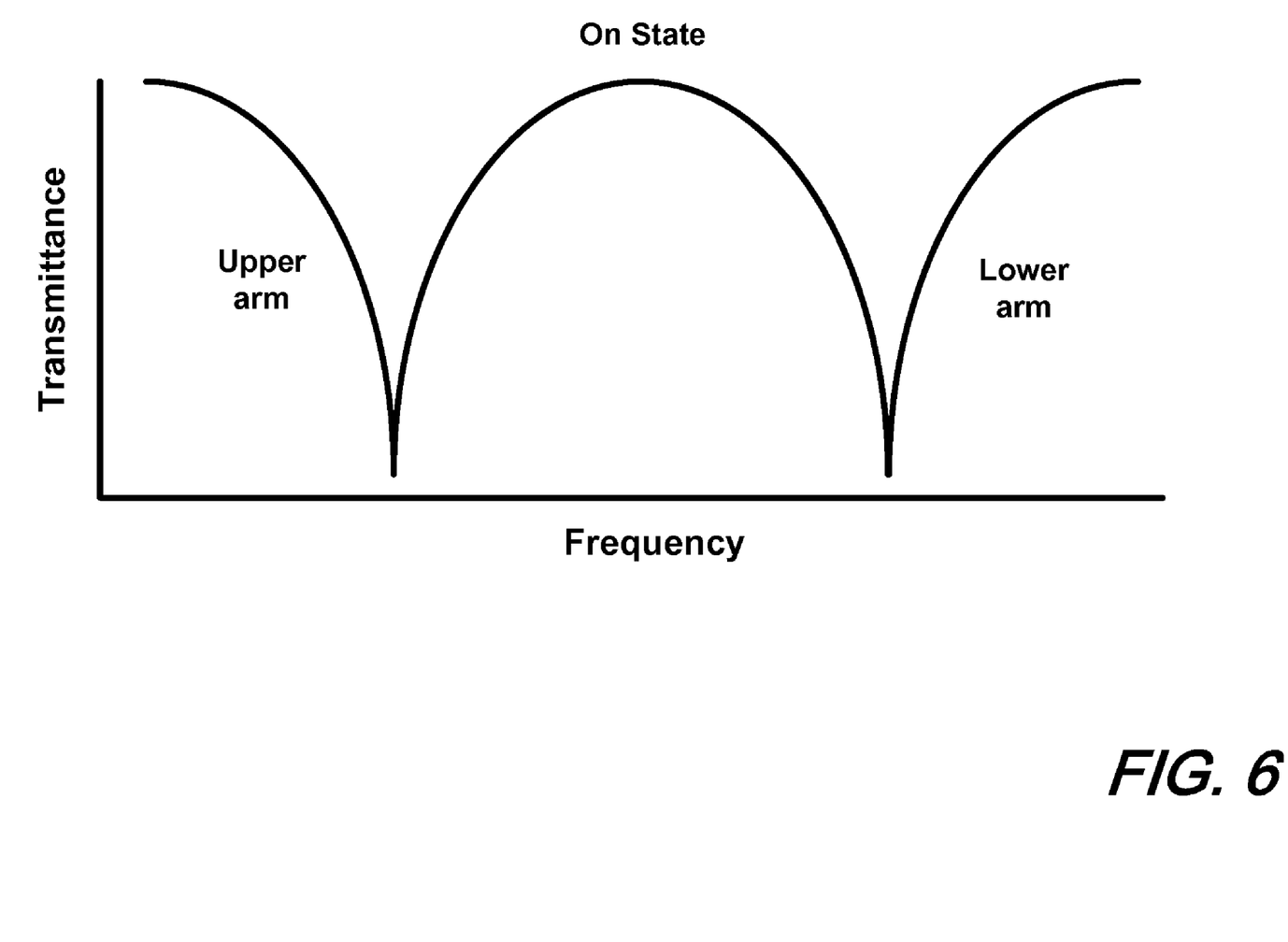
FIG. 6, is a graph of Transmittance vs. Frequency at an on-state for the modulator of FIG. 1.

Conversely, the modulator is turned "on" by moving the resonances in opposite directions. Accordingly, if the resonances are moved or otherwise sharpened/made more narrow thereby reducing the overlap between them, this will effectively turn "on" the modulator. Such an "on" state is shown graphically in FIG. 6, which shows a graph of Transmittance vs. Frequency for the modulator of FIG. 1 wherein the overlap has been sufficiently reduced to produce the "on" state.

Figure 7:
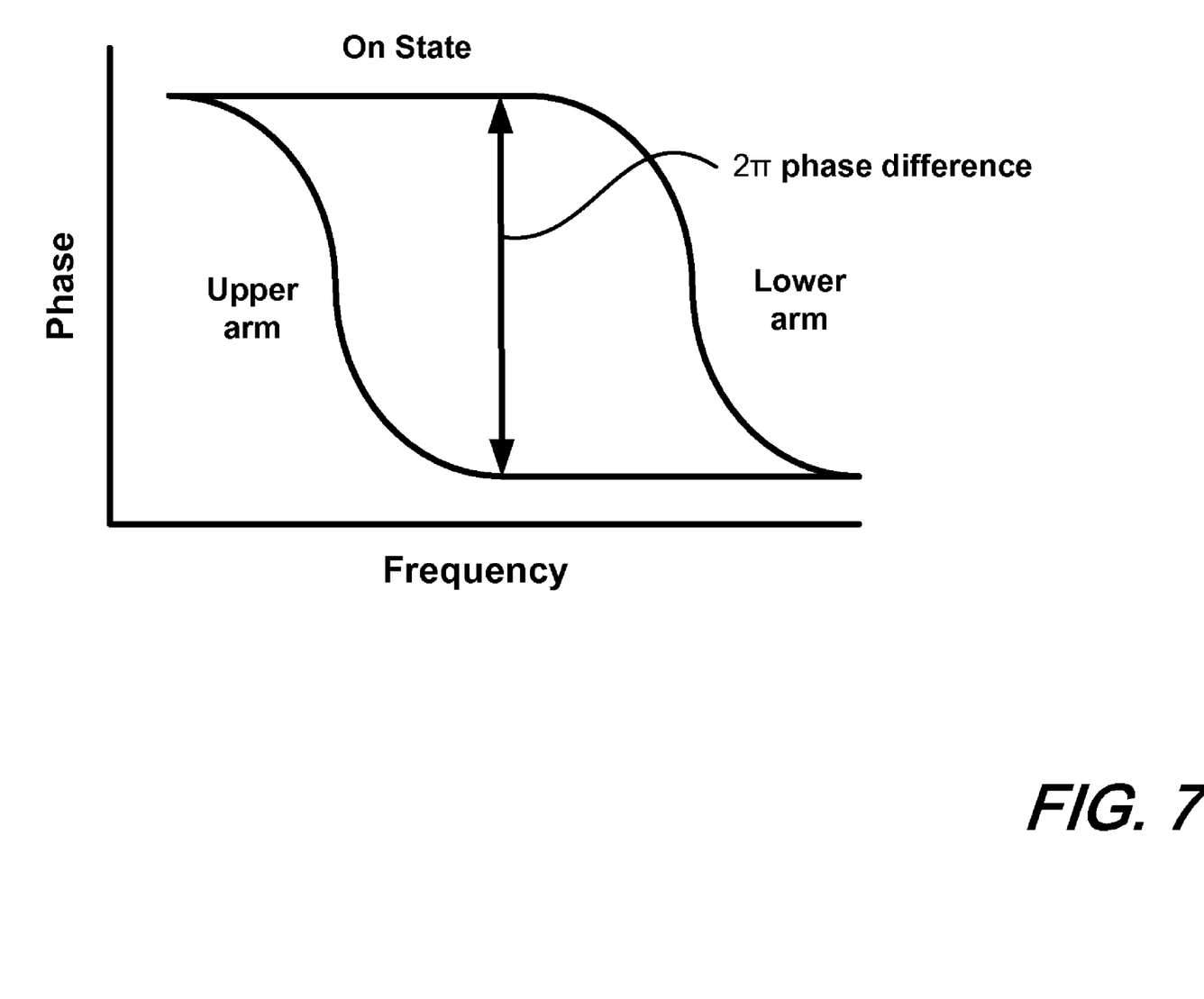
FIG. 7, is a graph of Phase vs. Frequency depicting the $2\pi$ phase difference between the lower arm and the upper arm of the modulator of FIG. 1 producing an "on" state in the modulator.
Figure 8:
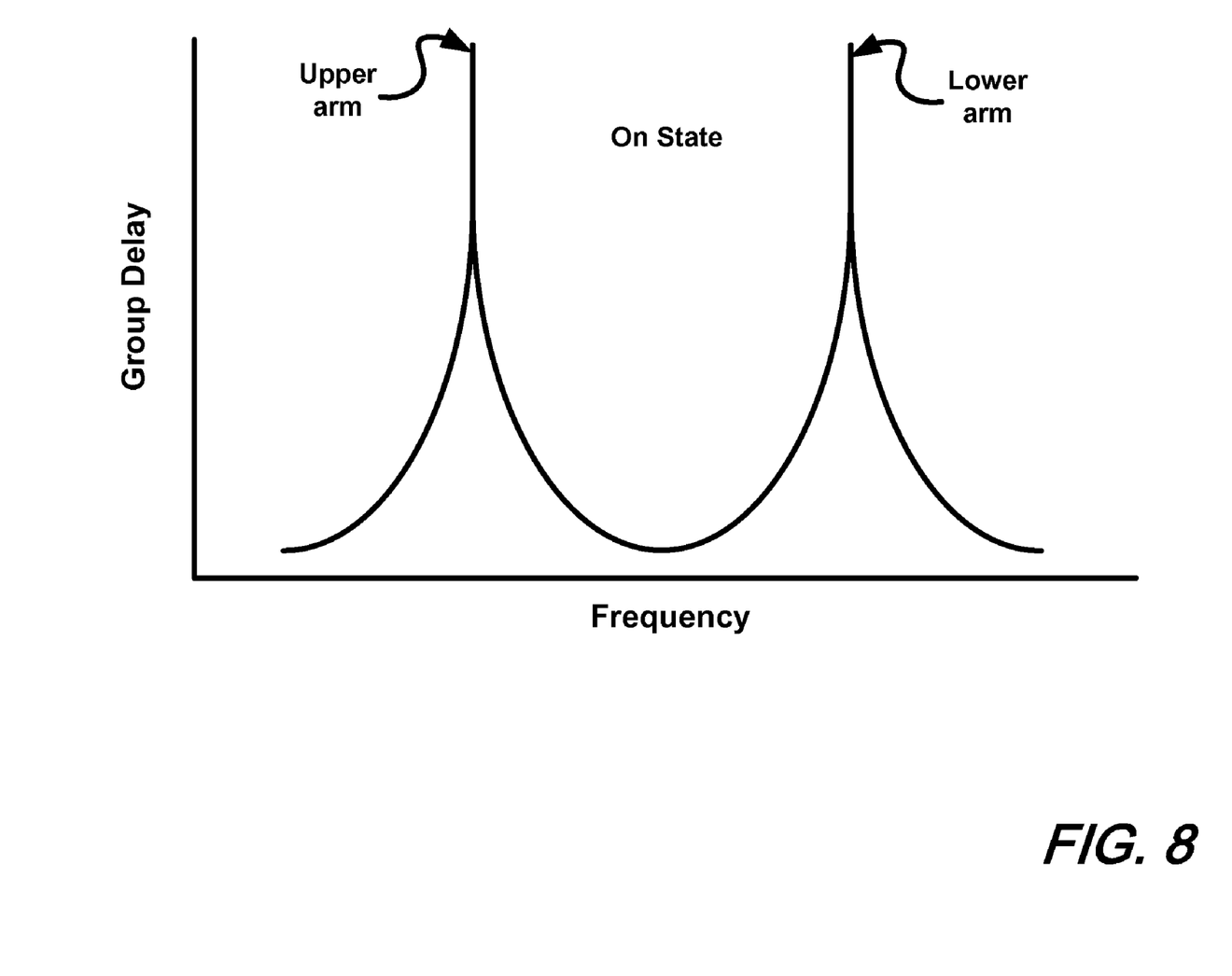
FIG. 8, is a graph of Group Delay vs. Frequency at an on-state for the modulator of FIG. 1.

FIG. 7 is a graph of Phase vs. Frequency depicting the $2\pi$ phase difference between the lower arm and the upper arm of the modulator of FIG. 1, while FIG. 8 is a graph of Group Delay vs. Frequency for the on-state of the modulator.

As can be appreciated, when the overlap between the two resonances in the two arms is sufficiently reduced, the resulting phase shifts in each of the arms of the modulator are in graphically-opposite directions. Advantageously, and according to the present invention, this produces an optical modulation exhibiting a very small, or minimal amount of chirp.

Figure 9:
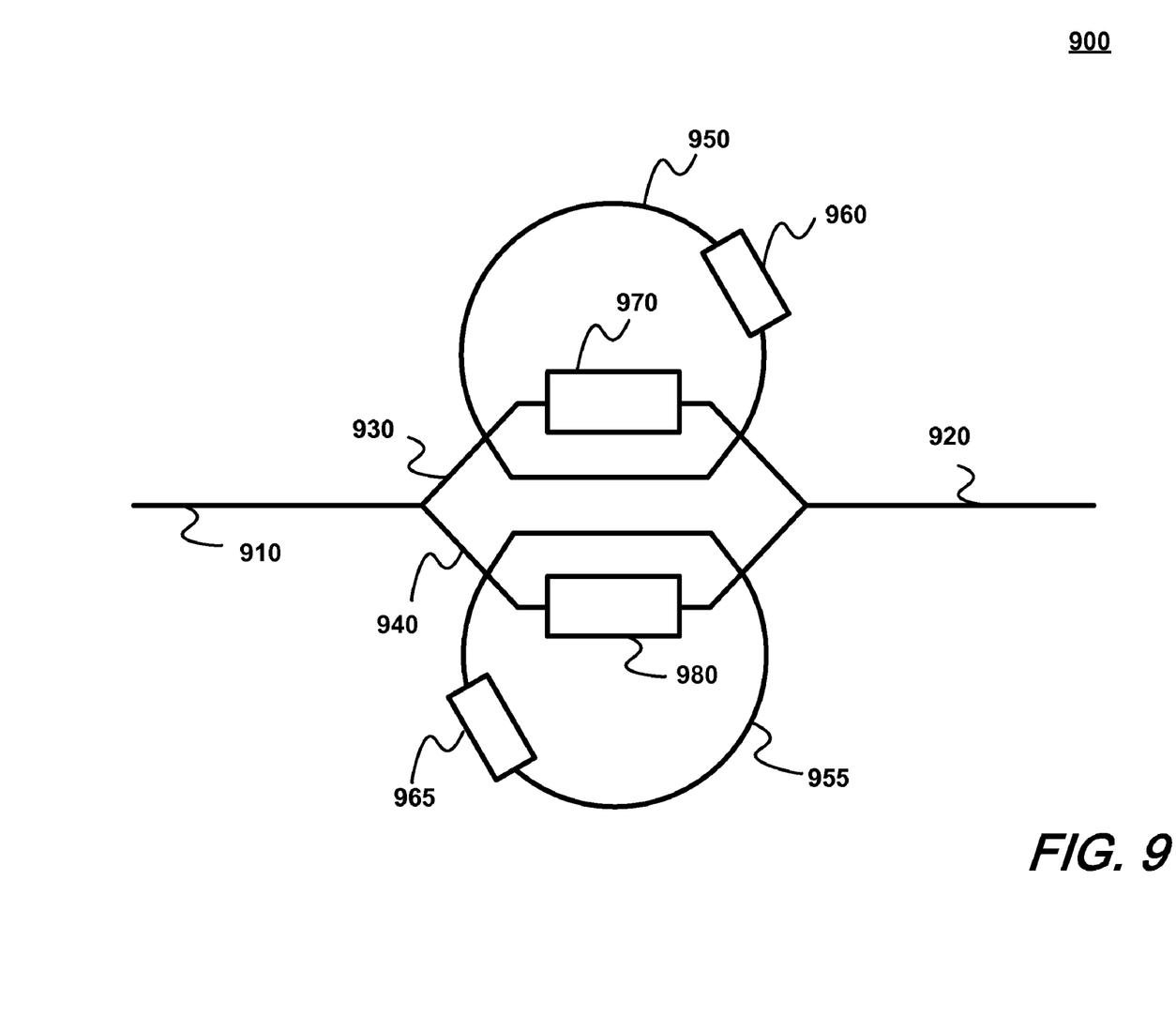
FIG. 9 is a schematic of a modulator constructed according to the present invention.

Of further advantage, the overlap between the resonances in each of the arms may be tuned by changing the width, or position, or both—of the resonances. Turning our attention now to FIG. 9, there is shown a schematic of a modulator/resonator structure having a tunable coupler—constructed according to an aspect of the present invention More particularly, shown in FIG. 9 is a Mach-Zehnder (MZI) type modulator 900, having input 910, and output 920 waveguides coupled to both the upper 930 and lower 940 arms of the Mach-Zehnder structure. As shown further in that FIG. 9, the upper arm 940 includes a resonator ring 950 having a ring phase shifter 960 positioned within the optical path of the ring. In addition, both upper 930 and lower 940 arms of the MZI structure include phase shifters 970, and 980, respectively.

When constructed in this manner, changing the ring phase shifter 960 will predominately change the spectral location of the resonance. As can be appreciated, when a change in the effective index of the waveguide is accompanied by a change in the propagation loss of the waveguide, the accompanying change in resonator loss will have an impact on the resonance shape.

Further, changing phase shifter 980 within the lower 940 arm of the MZI structure, will change both the width and position of the resonance. Appropriately changing both phase shifters 970 and 980 will advantageously change only the width (shape) of the resonance.

Additionally, note that if only one of the MZI phase shifters (970, 980) is changed, the symmetry of the associated optical phase changes in each arm may be improved by setting the resonator in each arm appropriately. For example, according to the invention, the device may be driven push-pull so that the resonator in that arm which experiences an increase in refractive index responds such that the resonance peak becomes sharper. Likewise, the other resonator in that arm which experiences a decrease in index also responds such that the resonance peak becomes sharper.

Finally, note also that a mixture of high-speed and low-speed tuning elements may be used to increase device efficiency and flexibility.

By way of demonstrating further examples of the present invention in operation, differential phase shift keying (DPSK) and higher order advanced modulation formats advantageously benefit from the minimal chirp associated with the present invention. Accordingly, materials are employed which exhibit a change in optical propagation loss when the optical index is changed. Of particular interest, this approach—according to the present invention—may be employed to produce other amplitude-phase modulated formats in addition to DPSK including duobinary, alternate mark inversion, alternate block inversion and others.

As can now be appreciated, according to the invention, resonance peaks are tuned in opposition directions to minimize the chirp. In this present case however, the Mach-Zehnder modulator is configured such that when the absorption peaks overlap each other the phase relationship created from the two arms of the MZM results in a null output from the MZM. In preferred embodiments, the resonance responses from the two arms of the MZM exhibit a similar shape and each resonance peak is relatively symmetric in its spectral absorption shape.

Figure 10:
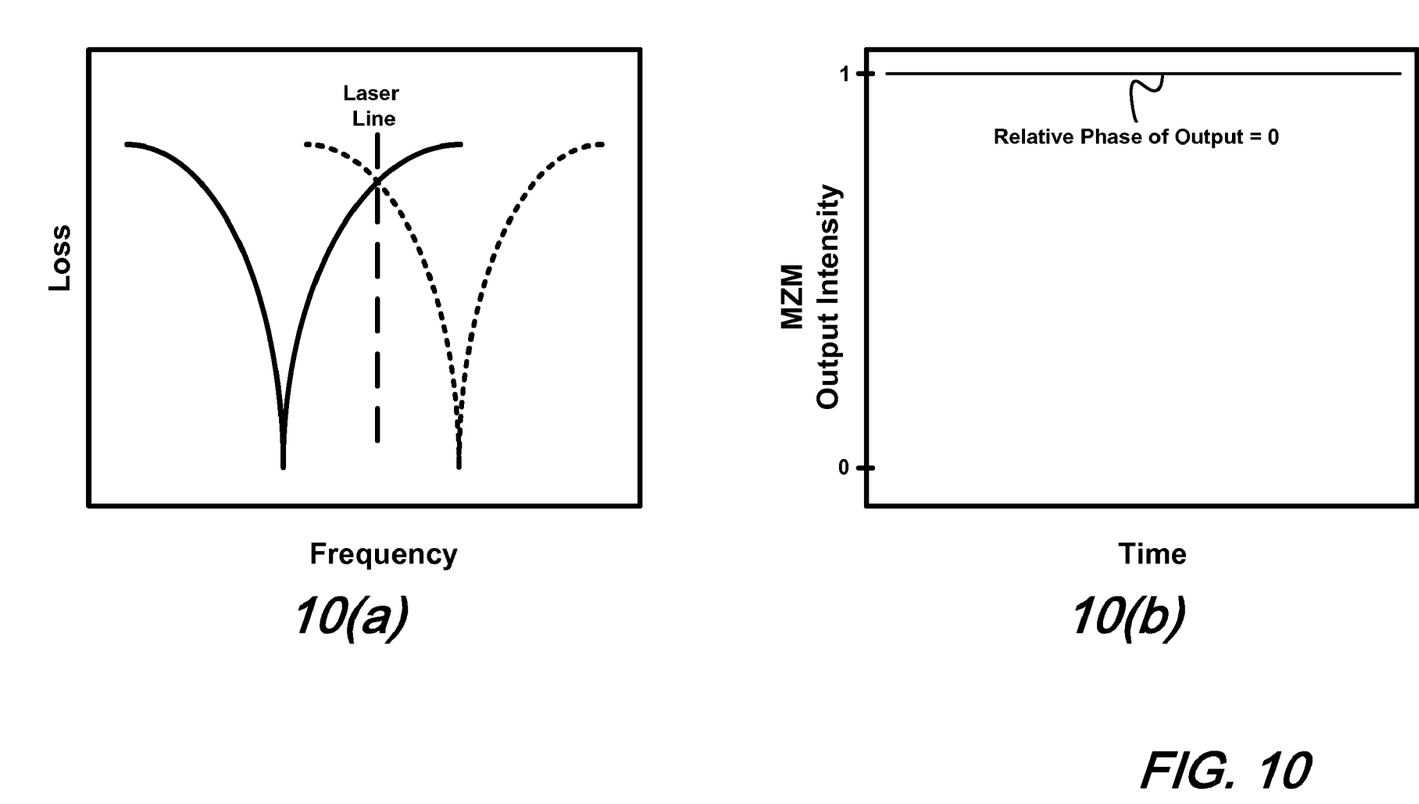
FIG. 10 is a pair of graphs showing the resonance overlap (10(a)) and respective output intensity (10(b)) for the Mach-Zehnder modulator constructed according to the present invention where there exists less than substantial resonance overlap.

For example, with reference to FIG. 10, there it is shown the positions of the resonances such that there is maximum output from the modulator. In these positions, there exists a constructive interference at the output waveguide of the MZM.

Figure 11:
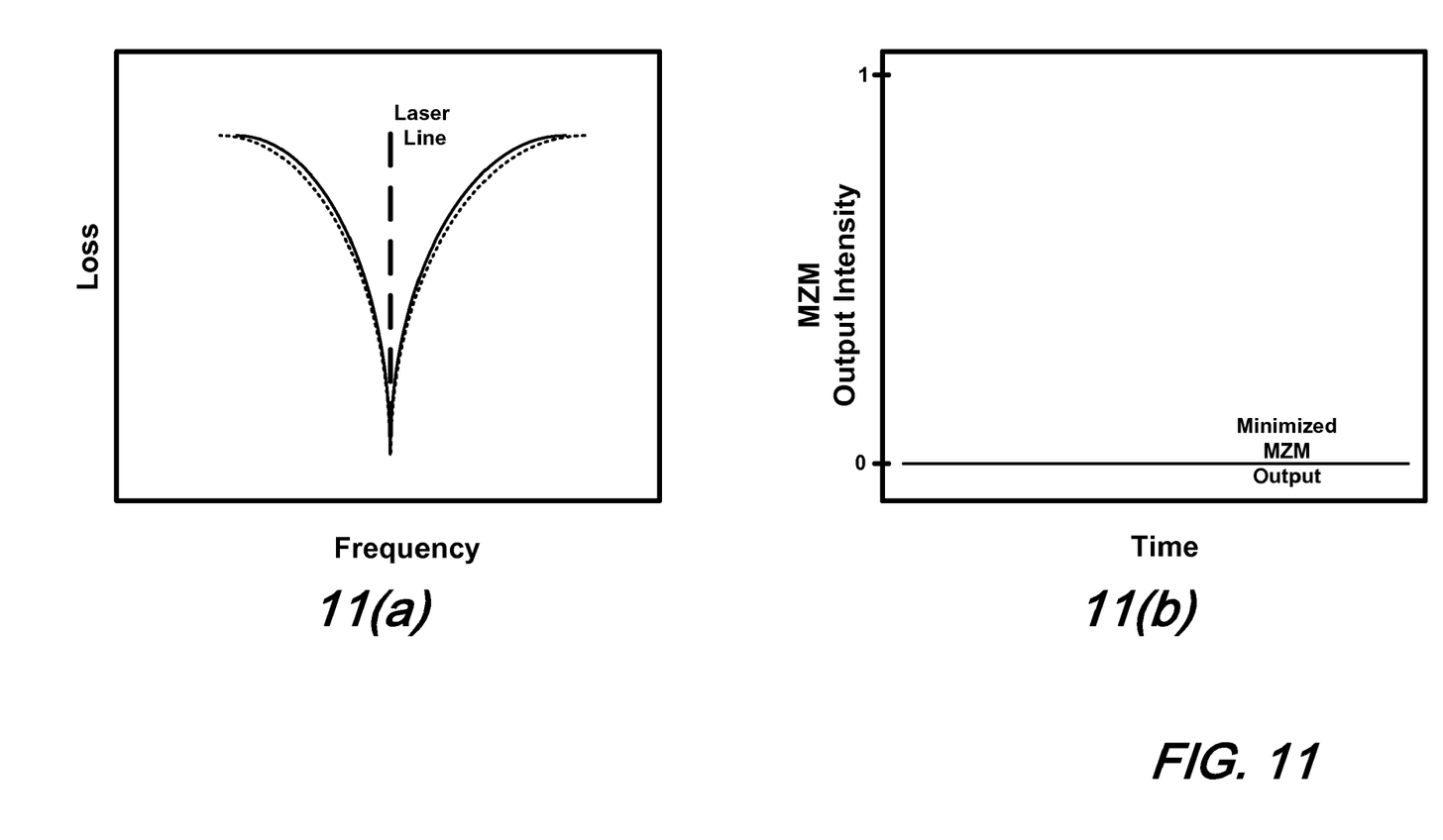
FIG. 11 is a pair of graphs showing the resonance overlap (11(a)) and respective output intensity (11(b)) for the Mach-Zehnder modulator constructed according to the present invention, wherein there exists substantial resonance overlap.
Figure 12:
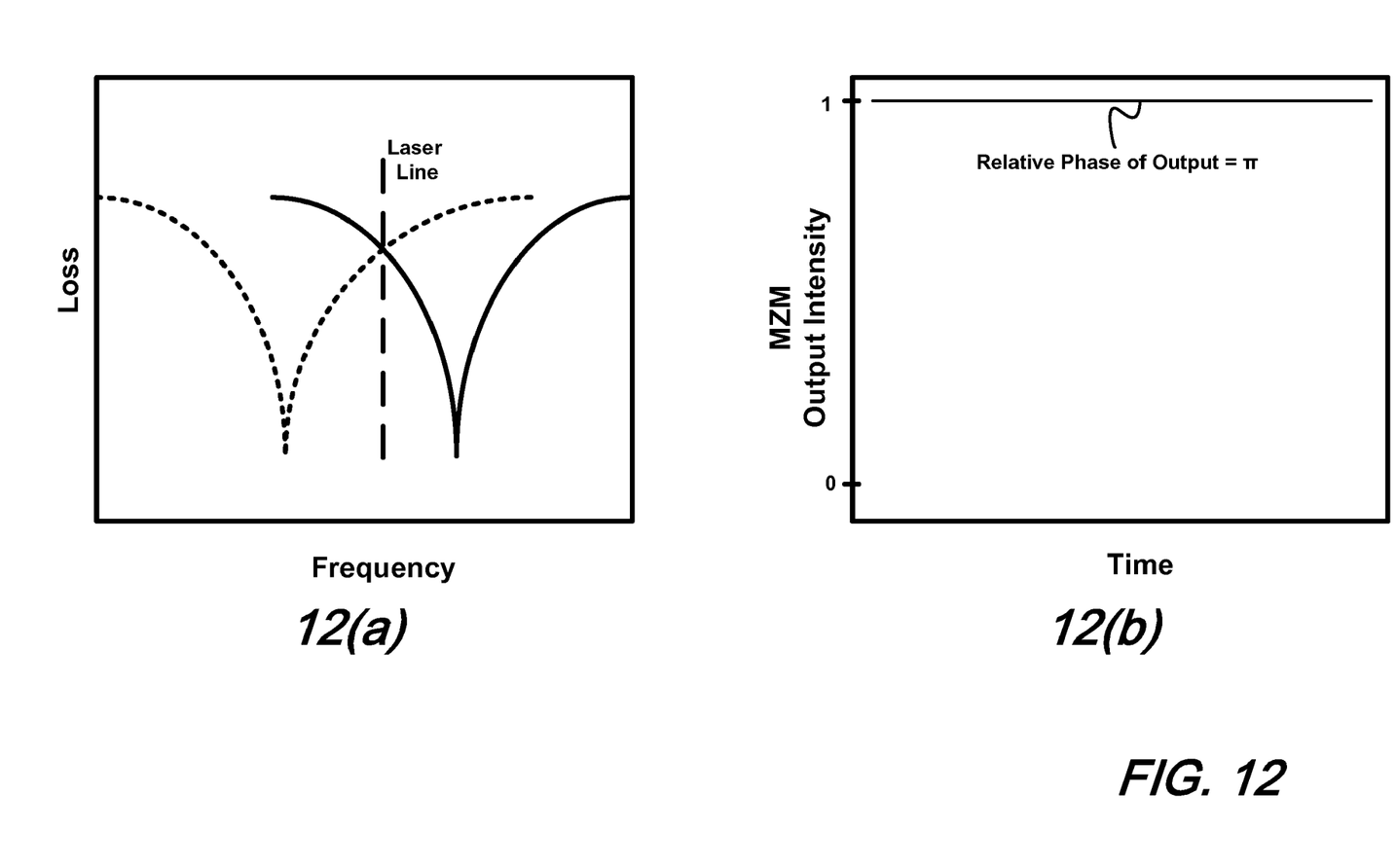
FIG. 12 is a pair of graphs showing resonance the overlap (12(a)) and respective output intensity (12(b)) for the Mach-Zehnder modulator constructed according to the present invention wherein there exists less than substantial overlap resulting from the continuation of displacement from FIG. 10 through FIG. 11.

If the resonances are then shifted to those shown in FIG. 11, the output from the MZM is minimized. Finally, if the resonances are further shifted to those depicted in FIG. 12, the MZM output intensity is increased to that shown where the phase is substantially equal to $\pi$.

Advantageously, and as noted before, depending upon the configuration and mode of drive, the output from the MZM may be a DPSK output or, if the response is appropriately bandwidth limited, the output may be duobinary.

At this point, while the present invention has been shown and described using some specific examples, those skilled in the art will recognize that the teachings are not so limited. Accordingly, the invention should be only limited by the scope of the claims attached hereto.

What is claimed is:

1. A semiconductor optical modulator comprising:
   a Mach-Zehnder device including two arms; and
   at least two optical resonators optically coupled to the arms of the Mach-Zehnder device, wherein each of the arms of the Mach-Zehnder device is coupled to at least one of the resonators;
   wherein each of the resonators exhibit a particular resonance frequency; and
   a plurality of phase shifters, wherein at least one of said plurality of phase shifters is positioned within each arm of the Mach Zehnder device and alters the optical coupling ratio between each arm and the corresponding resonator, and at least one of said plurality of phase shifters positioned within each one of the resonators tunes the respective resonance frequency,
   wherein upon simultaneously altering one or more of the coupling ratios and tuning the respective resonance frequencies, the resonance frequencies substantially overlap one another such that the modulator is turned to an 'on state' exhibiting a desired phase modulation, such that the modulator operates in two 'on states' exhibiting a '0' or a '$\pi$' phase shift between the 'on states', such that the modulator modulates an input signal according to a format selected from the group consisting of differential phase shift keying (DPSK), differential quadrature phase shift keying (DQPSK), phase amplitude modulation (PAM), duobinary, and their higher order embodiments.

2. A method of operating a semiconductor optical modulator having:
   a Mach-Zehnder structure including a pair of resonators, each resonator optically coupled to a respective arm of the Mach-Zehnder structure, wherein each one of said resonators exhibits a characteristic resonance peak;
   the method comprising the steps of:
   altering the optical path length of one or more of the resonators such that the resonance peaks are brought closer together thereby imparting a desired phase shift between optical signals traversing in the two arms of the modulator such that the modulator is turned to an 'on state';
   altering the optical path length of one or more of the resonators such that the resonance peaks are separated thereby imparting a desired phase shift between the optical signals traversing the two arms of the modulator such that the modulator is turned to an 'off state';
   altering the optical coupling ratio between the at least one arm and the corresponding resonator through the effect of adjusting at least one phase shifter of a plurality of phase shifters positioned in at least one arm of the Mach-Zehnder structure;
   altering the resonance peak through the effect of adjusting at least one phase shifter of said plurality of phase shifters positioned within a resonator;
   operating the modulator in two 'on states' exhibiting a '0' or a '$\pi$' phase shift between the two 'on states'; and
   alternating between said two 'on states',
   such that said modulator is operated to modulate an input optical signal according to a format selected from the group consisting of: differential phase shift keying (DPSK), differential phase shift keying (DPSK), differential quadrature phase shift keying (DQPSK), phase amplitude modulation (PAM), duobinary, and their higher order embodiments.

3. The method of claim 2 further comprising the step of:
   exchanging the positions of the resonance peaks.

4. The method of claim 2 further comprising the step of:
   altering the optical path length of one or more of the resonators such that the positions of the resonance peaks are interchanged.

5. The method of claim 2, wherein said modulator includes materials selected from the group consisting of Silicon, Indium Phosphide, Gallium Arsenide, a chromophore-doped polymer, a chromopher-based crystal, and thin-film Lithium-Niobate.

6. The method of claim 2, wherein said modulator includes a plurality of phase shifters positioned in the resonators.

* * * * *